(12) United States Patent
Pfohe et al.

(10) Patent No.: US 7,716,017 B2
(45) Date of Patent: May 11, 2010

(54) DISTRIBUTED PLUG-AND-PLAY LOGGING SERVICES

(75) Inventors: Thomas Pfohe, Hamburg (DE); Thorsten Laux, Hamburg (DE)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 10/222,554

(22) Filed: Aug. 16, 2002

(65) Prior Publication Data

US 2004/0034510 A1    Feb. 19, 2004

(51) Int. Cl.
  *G06F 11/00* (2006.01)
(52) U.S. Cl. .................. 702/188; 702/187; 709/225; 709/229
(58) Field of Classification Search ............. 702/188, 702/187
  See application file for complete search history.

(56) References Cited

U.S. PATENT DOCUMENTS

| | | | | |
|---|---|---|---|---|
| 6,282,175 B1 * | 8/2001 | Steele et al. | ............ | 370/254 |
| 6,363,421 B2 * | 3/2002 | Barker et al. | ............ | 709/223 |
| 6,453,356 B1 * | 9/2002 | Sheard et al. | ............ | 709/231 |
| 6,542,932 B1 * | 4/2003 | Brinnand et al. | ............ | 709/229 |
| 6,687,733 B2 * | 2/2004 | Manukyan | ............ | 709/200 |
| 6,735,691 B1 * | 5/2004 | Capps et al. | ............ | 713/1 |
| 6,889,172 B2 * | 5/2005 | Sierer et al. | ............ | 702/188 |
| 2002/0120717 A1 * | 8/2002 | Giotta | ............ | 709/219 |
| 2003/0005173 A1 * | 1/2003 | Shah et al. | ............ | 709/318 |
| 2003/0065764 A1 * | 4/2003 | Capers et al. | ............ | 709/224 |
| 2003/0149653 A1 * | 8/2003 | Penney et al. | ............ | 705/37 |
| 2003/0167421 A1 * | 9/2003 | Klemm | ............ | 714/37 |
| 2003/0217170 A1 * | 11/2003 | Nelson et al. | ............ | 709/231 |

* cited by examiner

*Primary Examiner*—Eliseo Ramos Feliciano
*Assistant Examiner*—Mi'schita' Henson
(74) *Attorney, Agent, or Firm*—Marsh Fischmann & Breyfogle LLP; Kent A. Lembke; Christopher P. Rauch

(57) ABSTRACT

Methods, systems, and articles of manufacture consistent with the present invention log information by reading a configuration file to determine a destination for sending logging information. The logging information is sent to the destination. Additional logging information is generated. It is determined whether the configuration file has been updated to indicate a new destination instead of the destination. When the configuration file has not been updated to indicate the new destination, the additional logging information is sent to the destination. When the configuration file has been updated to indicate the new destination, the additional logging information is sent to the new destination.

14 Claims, 8 Drawing Sheets

USER PROGRAM

DISTRIBUTED PLUG-AND-PLAY LOGGING SERVICES

FIELD OF THE INVENTION

The present invention relates to electronically logging information, and in particular, the invention relates to logging information on a distributed data processing system.

BACKGROUND OF THE INVENTION

As is known, it can be useful to log information on data processing systems. For example, program developers can log data and other information during program execution to determine whether a program is executing as desired. To do so, the program developer can insert instructions in the program code that invoke logging services to write log data to output devices.

A logging service executes either locally on the computer where the log data is generated or remotely on a server connected to the computer via a network. An instruction in the program code typically invokes a predetermined logging service that suits the program developer's logging requirements. In a typical data processing system, however, if the program developer wants to invoke a different logging service, then program developer must stop execution of the program and modify the instruction.

Based on the above-described problems of invoking logging services, it is therefore desirable to improve them.

SUMMARY OF THE INVENTION

Methods, systems, and articles of manufacture consistent with the present invention provide for automatically switching logging services while information is being logged from a running user program, without interrupting execution of the user program. Before executing the user program, a user inserts an instruction in the user program which, when executed, obtains a logger object that logs information. The user also inserts instructions in the user program which, when executed, call the logger object to log information that is provided in the call.

The logger object includes, in a wrapper, a logging service implementation that is used to log via a particular logging service. For example, the logging service can be either a local logging service that logs information on the data processing system where the user program is executing, or the logging service can be a remote logging service for logging information on a remote server. The logging service implementation that is included in the logger object wrapper is identified in a configuration file, which is monitored for updates. When the configuration file is modified, for example to identify a different logging service, the logging object automatically identifies the new logging service implementation and replaces its current logging service implementation with the new logging service implementation.

Therefore, the logging object automatically modifies itself to use different logging services, while logging information from the user program, without interrupting the user program's execution. When the user wants to use a different logging service for the logging object, the user modifies the configuration file instead of modifying the user program's code. For example, if the logging object is currently using a logging service to locally log information, the user can effect the logging object to use another logging service to remotely log information to a server by modifying the configuration file. The logging object will automatically update itself responsive to the modification to the configuration file.

In accordance with methods consistent with the present invention, a method in a data processing system having a program is provided. The method comprises the steps performed by the program of: reading a configuration file to determine a destination for sending logging information; sending the logging information to the destination; generating additional logging information; determining whether the configuration file has been updated to indicate a new destination instead of the destination; when the configuration file has not been updated to indicate the new destination, sending the additional logging information to the destination; and when the configuration file has been updated to indicate the new destination, sending the additional logging information to the new destination.

In accordance with methods consistent with the present invention, a method in a data processing system having a program is provided. The method comprises the steps performed by the program of: obtaining a manager object for reading a logging method identifier from a configuration file, the logging method identifier identifying a first logging method for logging information to a destination selected from a group of destinations consisting of a local destination and a remote destination, the first logging method selected from a group of logging methods each associated with one of the group of destinations; the manager object reading the configuration file to determine the first logging method identifier; obtaining a log object including the first logging method responsive to the manager object determining the first logging method identifier; the log object sending the logging information to the destination using the first logging method; generating additional logging information; determining whether the configuration file has been updated to indicate a second logging method identifier identifying a second logging method, the second logging method selected from the group of logging methods and being different from the first logging method; when the configuration file has not been updated to indicate the second logging method identifier, the log object sending the additional logging information to the destination using the first logging method; and when the configuration file has been updated to indicate the second logging method identifier, notifying the manager object that the configuration file has been updated; the manager object reading the configuration file to determine the second logging method identifier; the manager object notifying the log object to obtain the second logging method identifier from the manager object; the log object obtaining the second logging method identifier from the manager object; replacing the first logging method in the log object with the second logging method; and the log object sending the additional logging information to a new destination associated with the second logging method using the second logging method.

In accordance with articles of manufacture consistent with the present invention, a computer-readable medium containing instructions that cause a program in a data processing system to perform a method is provided. The method comprises the steps of: reading a configuration file to determine a destination for sending logging information; sending the logging information to the destination; generating additional logging information; determining whether the configuration file has been updated to indicate a new destination instead of the destination; when the configuration file has not been updated to indicate the new destination, sending the additional logging information to the destination; and when the configuration file has been updated to indicate the new destination, sending the additional logging information to the new destination.

In accordance with articles of manufacture consistent with the present invention, a computer-readable medium containing instructions that cause a program in a data processing system to perform a method is provided. The method comprises the steps of: obtaining a manager object for reading a logging method identifier from a configuration file, the logging method identifier identifying a first logging method for logging information to a destination selected from a group of destinations consisting of a local destination and a remote destination, the first logging method selected from a group of logging methods each associated with one of the group of destinations; the manager object reading the configuration file to determine the first logging method identifier; obtaining a log object including the first logging method responsive to the manager object determining the first logging method identifier; the log object sending the logging information to the destination using the first logging method; generating additional logging information; determining whether the configuration file has been updated to indicate a second logging method identifier identifying a second logging method, the second logging method selected from the group of logging methods and being different from the first logging method; when the configuration file has not been updated to indicate the second logging method identifier, the log object sending the additional logging information to the destination using the first logging method; and when the configuration file has been updated to indicate the second logging method identifier, notifying the manager object that the configuration file has been updated; the manager object reading the configuration file to determine the second logging method identifier; the manager object notifying the log object to obtain the second logging method identifier from the manager object; the log object obtaining the second logging method identifier from the manager object; replacing the first logging method in the log object with the second logging method; and the log object sending the additional logging information to a new destination associated with the second logging method using the second logging method.

In accordance with systems consistent with the present invention, a data processing system is provided. The data processing system comprises: a secondary storage device having a configuration file; a memory comprising a program that reads a configuration file to determine a destination for sending logging information, sends the logging information to the destination, generates additional logging information, determines whether the configuration file has been updated to indicate a new destination instead of the destination, sends the additional logging information to the destination when the configuration file has not been updated to indicate the new destination, and sends the additional logging information to the new destination when the configuration file has been updated to indicate the new destination; and a processing unit that runs the program.

In accordance with systems consistent with the present invention, a data processing system is provided comprising: means for reading a configuration file to determine a destination for sending logging information; means for sending the logging information to the destination; means for generating additional logging information; means for determining whether the configuration file has been updated to indicate a new destination instead of the destination; means for sending the additional logging information to the destination when the configuration file has not been updated to indicate the new destination; and means for sending the additional logging information to the new destination when the configuration file has been updated to indicate the new destination.

In accordance with articles of manufacture consistent with the present invention, a computer-readable memory device encoded with a program having a data structure is provided. The program is run by a processor in a data processing system. The data structure comprises: a method for logging information to a destination, wherein the program monitors a configuration file for changes to indicate that the program is to use a new method for logging the information to a new destination, such that when the configuration file changes, the program replaces the method with the new method for logging the information to the new destination.

The above-mentioned and other features, utilities, and advantages of the invention will become apparent from the following detailed description of the preferred embodiments of the invention together with the accompanying drawings.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Methods, systems, and articles of manufacture consistent with the present invention provide for automatically switching logging services while information is being logged from a running user program, without interrupting execution of the user program. A user provides an instruction in the user program which, when executed, obtains a logger object that logs information. The user also provides instructions in the user program which, when executed, call the logger object to log information that is provided in the call.

The logger object includes, in a wrapper, a logging service implementation that is used to log via a particular logging service. The logging service implementation that is included in the logger object wrapper is identified in a configuration file, which is monitored by a log manager object. The log manager object is created the first time a logger object is invoked. When the configuration file is modified, for example to identify a different logging service, the log manager object notifies the logger object and reads the contents of the configuration file. The logger object then identifies the new logging service from the log manager object and replaces its current logging service implementation with the new logging service implementation.

Therefore, when the user wants to use a different logging service, the user modifies the configuration file instead of modifying the user program's code. So the user does not have to interrupt the user program's execution. The logging object automatically modifies itself to use the different logging service, while logging information from the user program, after the configuration program is modified. For example, if the logging object is currently using a logging service to locally log information, the user can effect the logging object to use another logging service to remotely log information to a server by modifying the configuration file. The logging object will automatically update itself responsive to the modification to the configuration file.

Figure 1:
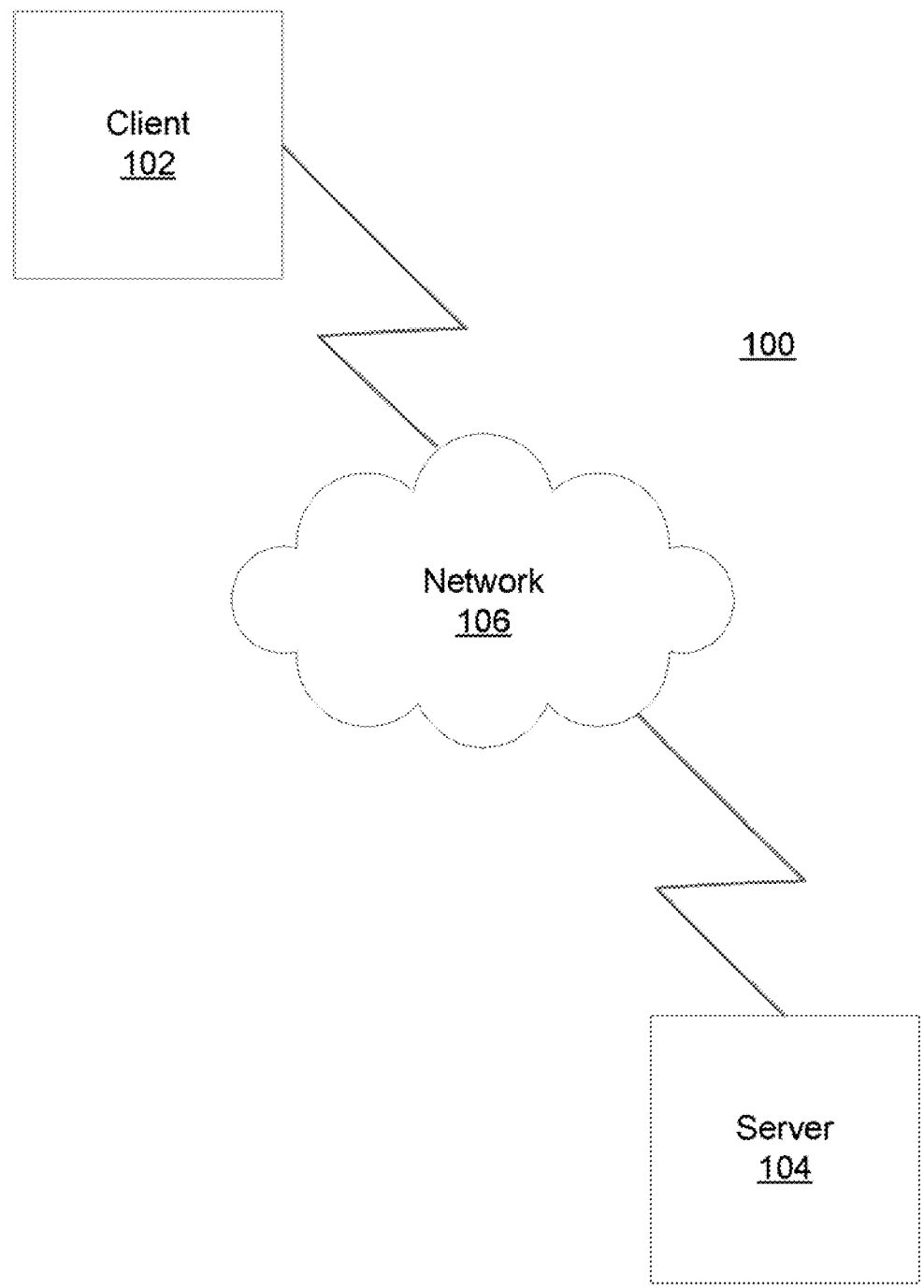
FIG. 1 depicts a block diagram of a data processing system suitable for use with methods and systems consistent with the present invention.

FIG. 1 depicts a block diagram of a data processing system 100 suitable for use with methods and systems consistent with the present invention. Data processing system 100 comprises a client computer system 102 and a server computer system 104, which are each connected to a network 106, such as a Local Area Network, Wide Area Network, or the Internet. The client computer system can be, for example, a personal computer, and the server computer system can be, for example, a logging server.

Figure 2:
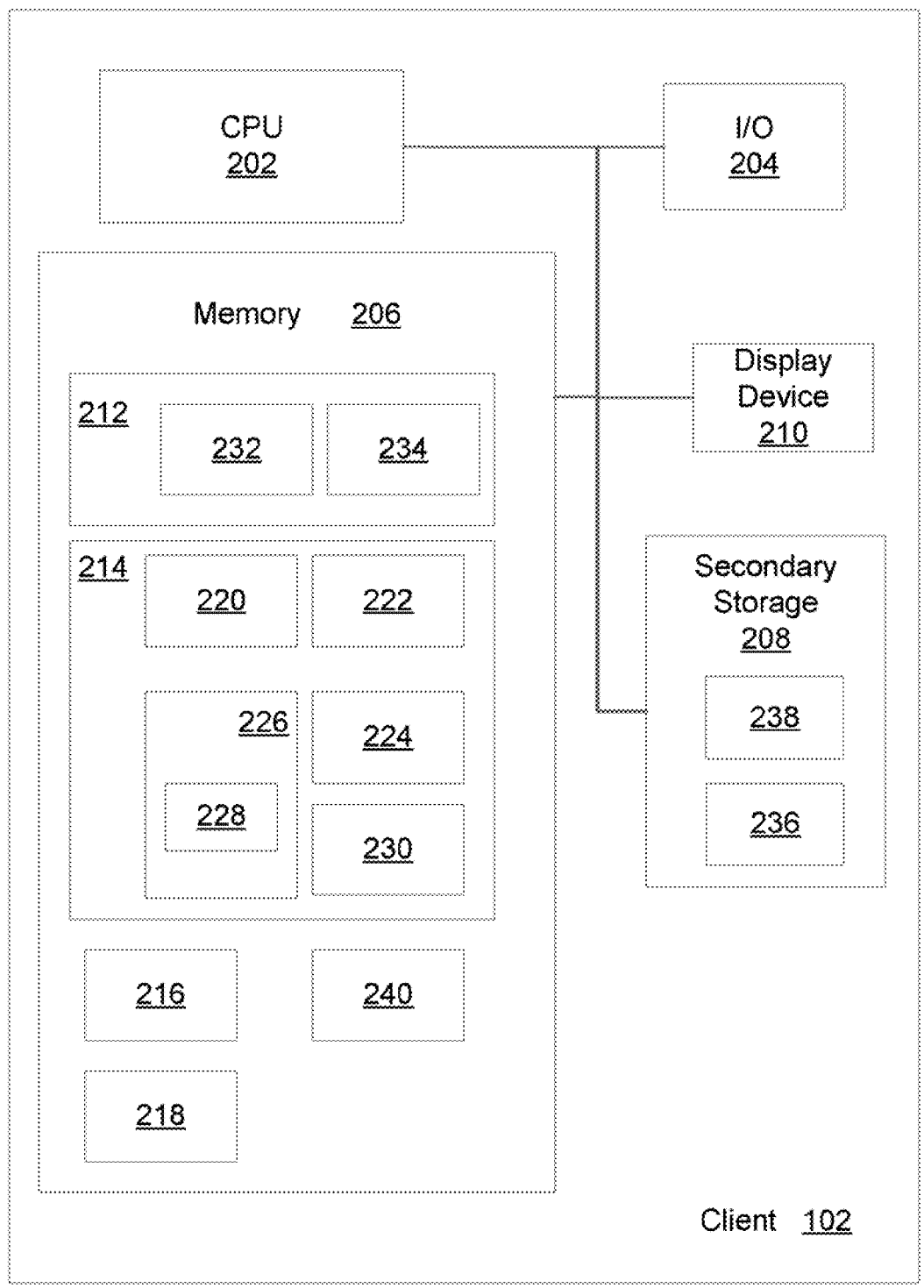
FIG. 2 depicts a block diagram of the client computer system of FIG. 1.

Referring to FIG. 2, FIG. 2 depicts the client computer system. As illustrated, the client computer system comprises a central processing unit (CPU) 202, an input output I/O unit 204, a memory 206, a secondary storage device 208, and a display device 210. The client computer system may further comprise standard input devices such as a keyboard, a mouse or a speech processing means (each not illustrated).

Memory 206 contains a user program 212 for which a user wants to log information, a logging framework 214 for managing the logging, a local logging wrapper 216 for interfacing to a local logging program 240, and a remote logging wrapper 218 for interfacing to a remote logging program 312. Each of these items will be described in further detail below.

The logging framework comprises a logger object 226 that includes a data structure 228 having an entry reflecting a method for logging information to a destination, wherein the logging framework monitors a configuration file 238 for changes to indicate that the logger object is to use a new method for logging the information to a new destination, such that when the configuration file changes, the logger object replaces the method with the new method for logging the information to the new destination, as will be described in more detail below.

Figure 3:
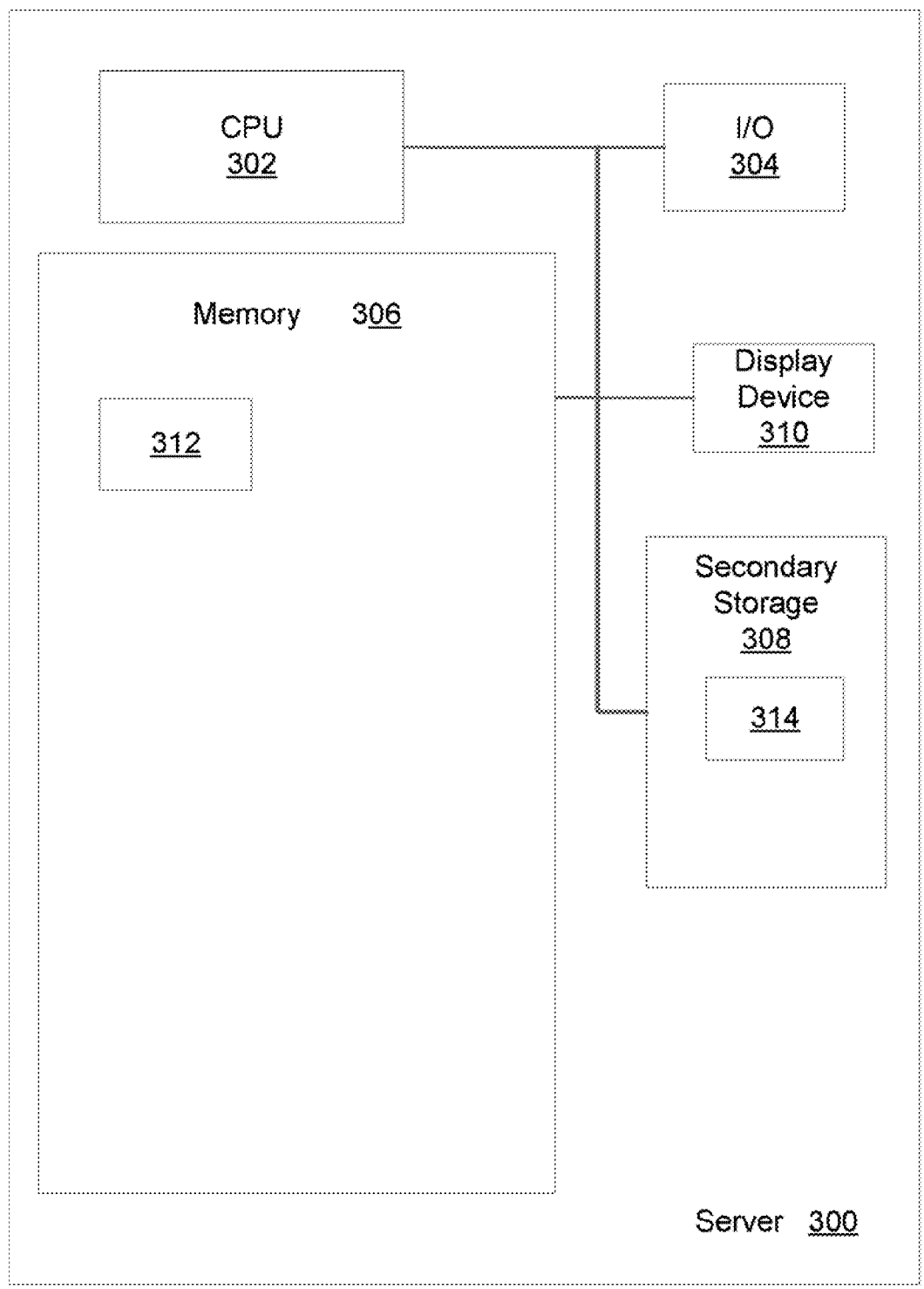
FIG. 3 depicts a block diagram of the server computer system of FIG. 1.

Referring to FIG. 3, FIG. 3 depicts a block diagram of the server computer system of FIG. 1. The server system comprises a central processing unit (CPU) 302, an input output I/O unit 304, a memory 306, a secondary storage device 308, and a display device 310. The server computer system may further comprise standard input devices such as a keyboard, a mouse or a speech processing means (each not illustrated).

Memory 306 contains log server program 312 for logging information, which is received from the client computer system, at the server computer system. The log server program will be described in further detail below.

Referring back to FIG. 2, the user program can be any known program, such as a word processing program or spreadsheet program. For example, the user program can be the StarOffice® Writer word processing program manufactured by Sun Microsystems, Inc., Palo Alto, Calif., U.S.A. Sun Microsystems, Sun, the Sun logo, and StarOffice are trademarks or registered trademarks of Sun Microsystems, Inc. in the United States and other countries. All product names described herein may be trademarks or registered trademarks of their respective owners.

The logging framework comprises a library of classes that are used to implement the logging. As will be described in more detail below, the logging framework comprises a logger class 220 that creates logger object 226 that is called by the user program, a log manager class 222 that creates a log manager object 230 that notifies the logger object when to update its logging configuration, and a watchdog 224 that notifies the log manager object when the logging configuration has changed.

The logger object is of a particular class, which will be referred to herein as the logger class. The logger class is introduced into the data processing system by the logging framework, and comprises properties for log level, log method, log method class, and log message. Log level identifies a logging priority level for the logger object, where log levels having a higher priority will take precedence over log levels having a lower priority. For example, the logger class can provide for the following four log levels in descending order of priority: SEVERE, WARNING, INFO, and CONFIG. A log object having a log level of SEVERE will take precedence over a log level of INFO. The logger class can also provide additional or other log levels.

The log method identifies which logging service implementation the log object will use. The log method class identifies the class of the log method. And the log message identifies what log information will be written. One of skill in the art will appreciate that the logger object can comprise additional properties to those listed above. An illustrative example of the logger object is shown in the appended code examples. The code examples, which are incorporated herein by reference, are merely illustrative and do not limit the present disclosure to the precise form disclosed.

Figure 4:
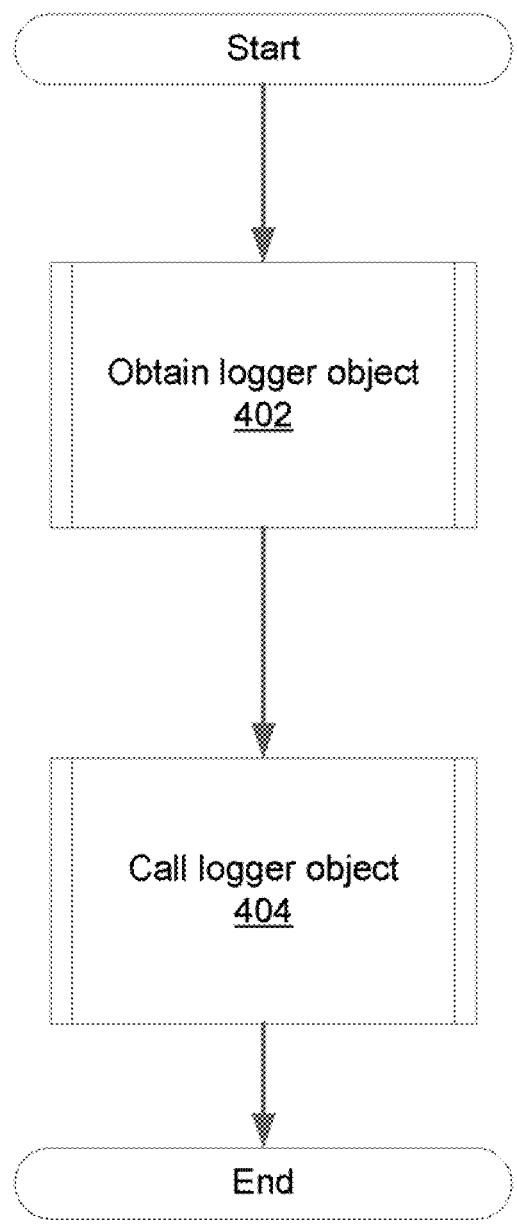
FIG. 4 depicts a flow diagram illustrating the steps performed by the user program.

Referring to FIG. 4, FIG. 4 depicts a flow diagram illustrating exemplary steps performed by the user program for logging information. The steps that are depicted in FIG. 4 are related to logging information, however, one of skill in the art will appreciate that the user program can comprise code for performing additional functionality. First, the user program obtains the logger object (step 402). The user program does this via a call to the logger class, where the call includes the name of the desired logger object. For example, step 402 can correspond to an instruction 232 (see FIG. 2) that is placed in the user program's code by the user. One of skill in the art will appreciate that instruction 232 will vary depending on the programming language used. For example, in Java, instruction 232 can comprise "getLogger," where the logger class contains a method called "getLogger." Instruction 232 also identifies the name of the logger object that will be created. So in the example, if the logger object's name is "com," instruction 232 comprises "getLogger("com")." The user can use any suitable naming convention, including a convention that creates a hierarchical tree of logger objects, such as a hierarchical dotted-separated namespace. As an illustrative example, a top level of logger object has the name "com" and a second level of logger object has the name "com.sun". All properties of the hierarchical logger objects are inherited.

Figure 5:
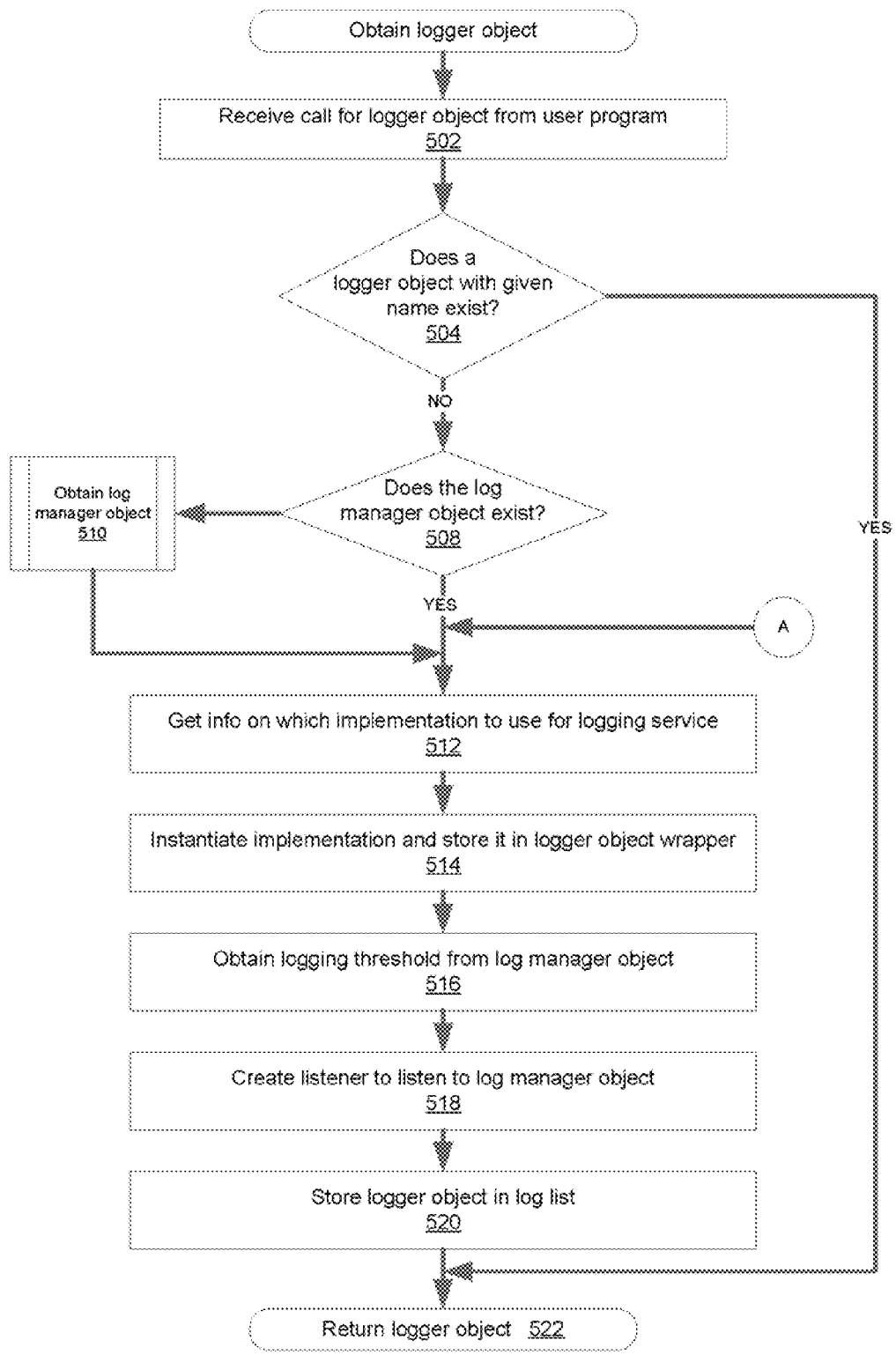
FIG. 5 depicts a flow diagram illustrating the steps performed by the logger class for obtaining a logger object.

FIG. 5 depicts a flow diagram illustrating exemplary steps performed by the logger class for returning a logger object responsive to the call from the user program. Referring to FIG. 5, first, the logger class, which is in the memory, receives the request from the user program to create the logger object (step 502). As described above, the request can be a call by the user program, and includes the name of the requested logger object.

The logger class then determines whether a logger object with the given name already exists (step 504). To do so, the logger class compares the logger object name with a list 236 of known logger objects. List 236 can be maintained in the secondary storage, however, one of skill in the art will appreciate that list 236 can be maintained elsewhere, such as in the memory. If the logger class determines that the logger object having the given name already exists in step 504, then the logger class returns that logger object to the user program (step 506).

If the logger class determines, in step 504, that the logger object does not already exist, then the logger class determines whether log manager object 230 already exists (step 508). The logger class makes this determination by calling the log manager class, which is part of the log manager framework, and asking if the log manager object already exists. The log manager class will look at its local variables and respond to the call from the logger class. If the logger class determines, in step 508, that the log manager object does not already exist, then the logger class invokes the log manager class to create the log manager object (step 510). A description of the steps performed by the log manager class for creating the log manager object is described below with reference to FIG. 6.

Figure 6:
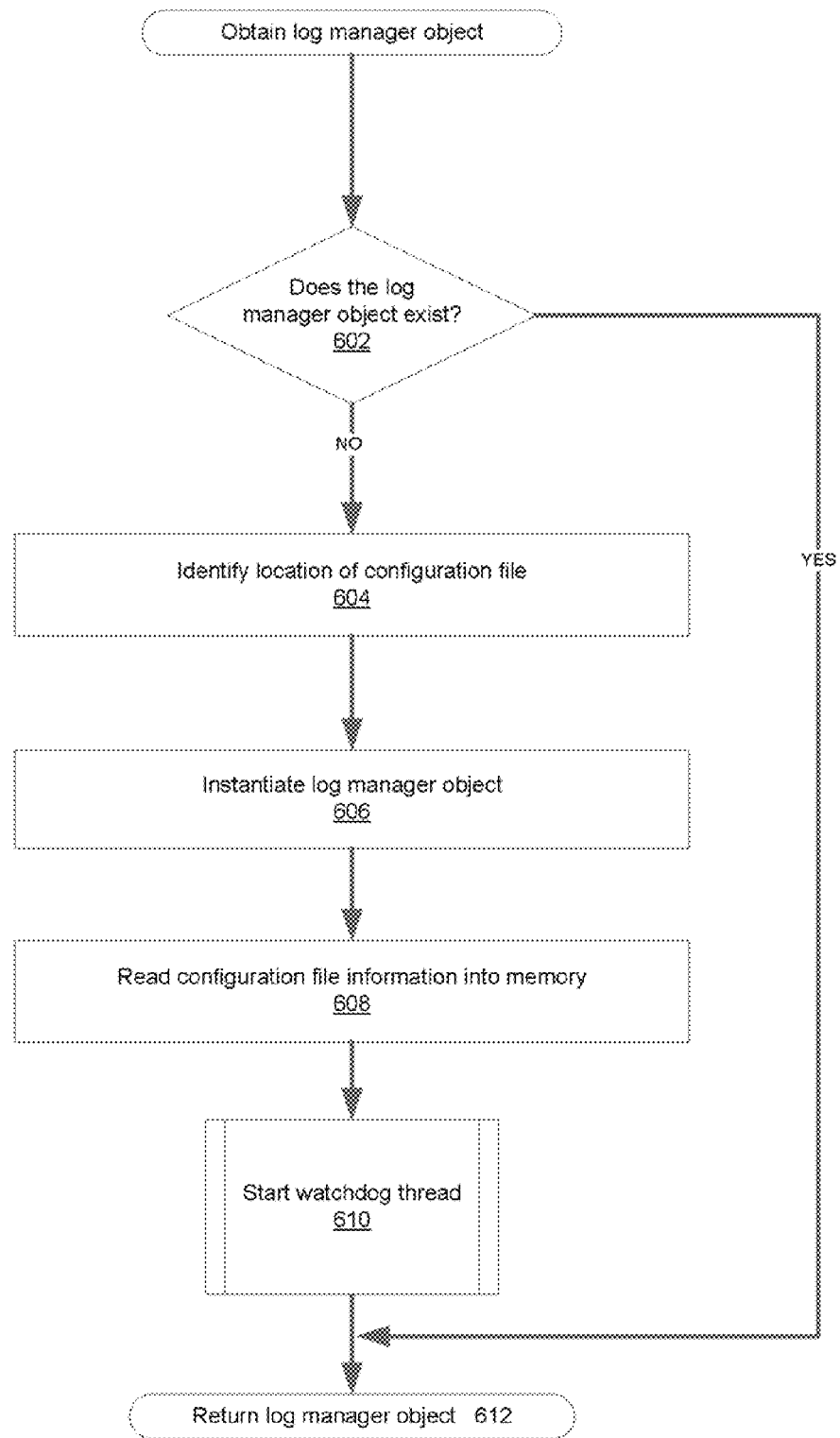
FIG. 6 depicts a flow diagram illustrating the steps performed by the log manager class for obtaining a log manager object.

As briefly described above, the log manager class creates log manager object 230 that notifies the logger object when to update its logging configuration. There can be a single global log manager object that notifies each of the logger objects. An illustrative example of the logger class is shown in the appended code examples. Referring to FIG. 6, to create the log manager object, the log manager class first determines whether the log manager object already exists (step 602). The log manager class does this by looking at its local variables and determining whether there already exists a log manager object. If the log manager class determines that the log manager object does not already exist in step 602, then the log manager class identifies where to find the code for implementation of the log manager object and where to find the configuration file. This code can be part of the log manager class code, however, the code can also come from a different source if the user wants to implement their own code. In the latter case, the user includes the location of the log manager object code in the call for the obtaining the logger object. For example, if the user program is written in Java, the call would include a "-D" extension with a file name of a file containing the code.

The configuration file contains a watch interval and information for configuring the logger object. As will be described below, the log manager object creates a watchdog thread that monitors the configuration file for updates at intervals specified by the watch interval. Therefore, if the watch interval equal to zero, the watchdog thread will not monitor the configuration file.

The information in the configuration file that relates to configuring the logger object comprises a log threshold, a logging service wrapper, and one or more handlers. As will be described below with reference to FIG. 8, when the user program calls the logger object in order to log information, the call includes a log level. The log level identifies a logging priority level for the log information. The log threshold provides a threshold value against which the log level in the call from the user program is compared, and corresponds to one of the log levels of the logger class. When the log level is lower than the log threshold, the information will not be logged. For example, if the log threshold is HIGH, and the log level in the call from the user program is LOW, which is lower than HIGH, then the logger object will not log the information in the call. This provides for globally filtering out low priority information.

The logging service wrapper contains a logging service implementation that will be incorporated into the logger object via a wrapper. This incorporation into the logger object is described in more detail below.

A handler specifies a device to which the log information is written when it is logged. For example, the handler can specify the video display or a printer.

After the log manager class determines where the log manager object code is located in step 604, the log manager class instantiates the log manager object (step 606). Then, the log manager class reads the configuration file information, parses it, and stores it in memory (step 608). As will be described below, the logger object retrieves this stored configuration file information from the log manager object responsive to a modification in the configuration file.

As the properties of the configuration file can be changed while the user program is executing, the log manager class provides for monitoring the configuration file for changes. As described above, the time interval for this monitoring is specified by the watch interval. In order to monitor the configuration file, the log manager class starts a watchdog thread after it reads the configuration file information in step 608 (step 610). As an example, the watchdog thread can be implemented through a watchdog object. The watchdog thread runs in an endless loop and actively looks at the configuration file for an instant during every watch interval. A description of the steps performed by the watchdog thread is described below with reference to FIG. 7.

Figure 7:
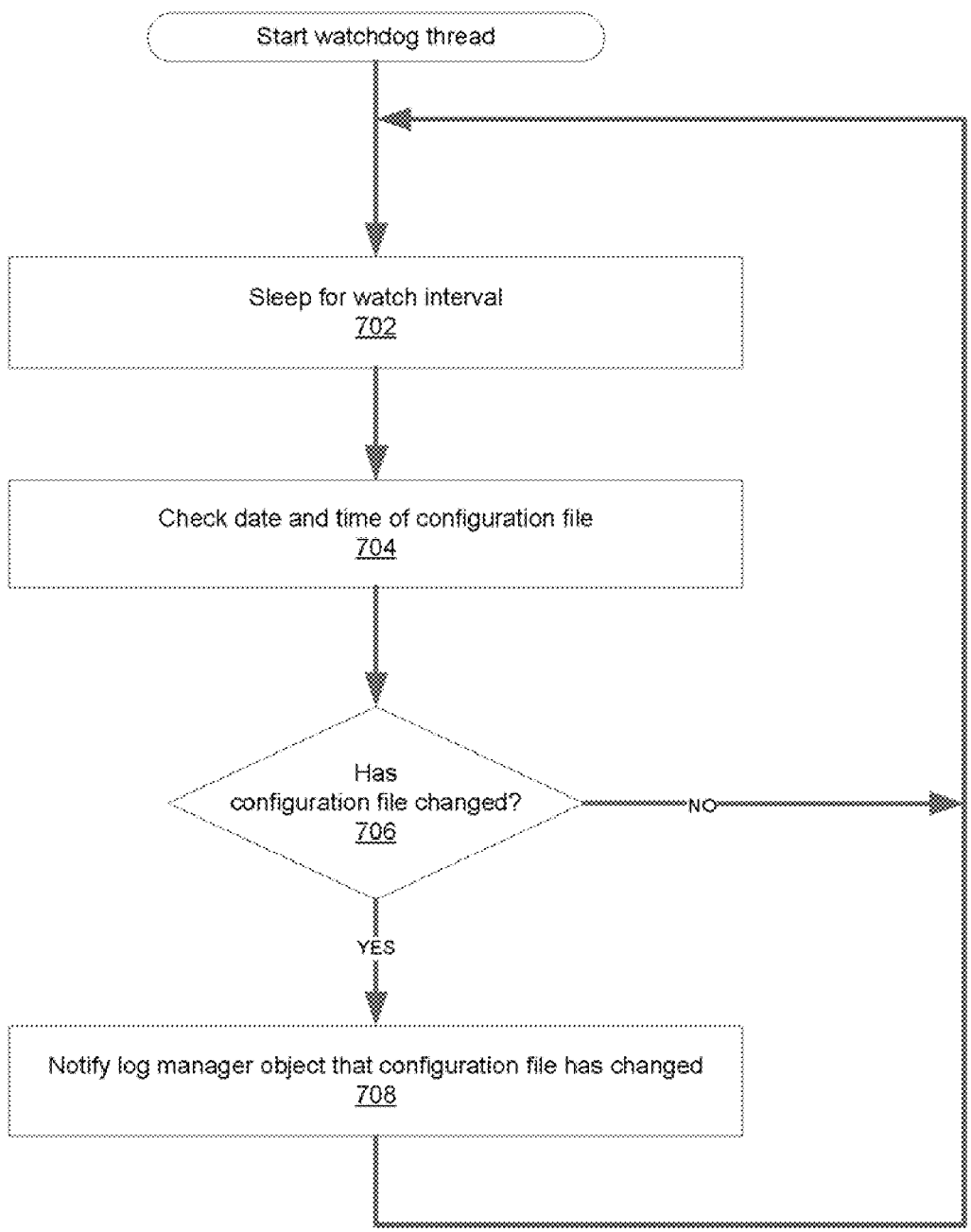
FIG. 7 depicts a flow diagram illustrating the steps performed by the watchdog thread.

Referring to FIG. 7, first, the watchdog thread sleeps for the watch interval and is then awoken by the operating system when the watch interval expires (step 702). The operating system knows when to awaken the watchdog thread, for example, by a watchdog object providing the watch interval to the operating system through a language construct, such as a language call. For example, in Java, the watchdog object invokes a "sleep" call to the operating system, in which it identifies the watchdog interval. As is known to one of skill in the art, the "sleep" call is a Java language construct that halts and awakens a thread. After the watchdog thread is awoken by the operating system, the watchdog thread checks the date and time of the configuration file (step 704). This can be done, for example, by reading the file access table. Then, the watchdog thread determines whether the configuration file has changed by comparing the newly read date and time to a previously read date and time (step 706).

If the watchdog thread determines in step 706 that the configuration file has changed, then the watchdog thread instructs the log manager object to reread the configuration file (step 708). If the watchdog thread determines that it has been idle for the watch interval in step 702, or that the configuration file has not changed in step 706, or after it has instructed the log manager object to reread the configuration file in step 708, then the watchdog thread resets the watchdog timer and remains idle for the watch interval (step 710).

Referring back to FIG. 6, after the log manager class starts the watchdog thread in step 610, or after the log manager class determines that the log manager object already exists in step 602, then the log manager class returns the log manager object to the logger class in response to the call sent in step 510 of FIG. 5 (step 612).

Accordingly, referring back to FIG. 5, after the log manager object is obtained in step 510, or when the logger class determines that the log manager object already exists in step 508, then the logger class identifies which logging service implementation to include in the logger object (step 512). The logger class includes the logging service implementation in the logging object by instantiating the logging service implementation within a wrapper in the logger object. The logger class does this by loading an implementation wrapper for the desired logging service into the logger object. Wrappers and instantiating services within objects are known to one of skill in the art and will not be described in more detail herein. A logging service implementation that is instantiated in the logger object is depicted in FIG. 2 as data structure 228, which is described above.

Which logging service implementation that gets included by the logger class is identified by the name of the logging service wrapper in the configuration file, as described above. The logging service can be, for example, a local logging program 240 (see FIG. 2) or a remote log server program 312 (see FIG. 3). Each of these logging services, and any others that are implemented, are used by the logger object to write log information to an output device at a particular location. For example, the local logging program can be the log4j program, which is manufactured by The Apache Software Federation, Forest Hill, Md. The log4j program is known to one of skill in the art and will not be described in further detail herein.

For each known logging service, there is a logging service wrapper, for example in the memory or in the secondary storage, that comprises the code to be implemented into the logger object for communicating to the logging service. Since each logging service can have different functions and use a different communication protocol, the logging service wrapper maps the logger object functions to the logging service functions and communicates to the logging service via a corresponding communication protocol. These functions can include, for example, a log level filter. In the illustrated example, where the local logging service can be the log4j program, a local logging wrapper 216 would map the logger object functions to the log4j functions, which are known in the art. Also, the local logging wrapper communicates to the log4j program via Java, which is used by the log4j program.

If the data processing system comprises a heterogeneous distributed data processing environment, it is possible that the client computer system does not have a local logging program. Also, the user may want to log information to the server computer system instead of to a local output device of the client computer system. For these scenarios, the user can identify in the configuration file that the logger object should include a remote logging service, such as log server program 312. The log server program can be any suitable program that provides a remote logging service, such as syslog demon, which is manufactured by Sun Microsystems, Inc. In this example, the logger class can instantiate a logging wrapper 218, which is capable of communicating with the syslog demon, into the logger object, wherein logging wrapper 218 maps the logger object functions to syslog demon's functions.

Since the user program and the log server program are separate processes, the implementation in the logger object wrapper uses a communication protocol to communicate across the process boundaries. The communication protocol can be, for example, Universal Network Objects (UNO), which is manufactured by the Openoffice.org, which is sponsored by Sun Microsystems, Inc. One of skill in the art will appreciate that the communication mechanism is not limited to UNO, and can also be, for example, inter-process communications, remote procedure calls, Common Object Request Broker Architecture (CORBA), or Component Object Model (COM), or any combination of these between the various programs. CORBA is a registered trademark of the Object Management Group, Inc. of Needham, Mass. COM is manufactured by Microsoft Corporation of Redmond, Wash.

As described briefly above, the configuration file also contains one or more handlers that are incorporated into the wrapper. A handler specifies on which output device the log information is to be written and formats the log information for that output device. For example, in addition to other known output devices, the handler can specify the display device, the secondary storage, or the memory. In an example where the log information is output to a printer, the handler configures the log information for the type of printer that is used.

When the configuration file is created, the user can also attach filters to the handlers. Filters allow the user to define a fine-grained decision about which log information is written to an output device. For example, as described above, log information will be sent to an output device if its log level is greater than or equal to the log threshold. Through the use of a filter, the user can further define that log information that is output to a particular device comprises, for example, a log message containing a string, such as "bootstrap", or that the log level (in addition to the normal threshold mechanism) is not SEVERE. These two conditions can be logically combined.

In step 512, when the logger object is being created, the logger class obtains the configuration file information from the log manager object. As described above, the log manager class reads the configuration file information into the memory for use by the log manager object in step 608. Then, the logger class instantiates the implementation in a wrapper for further use by the logger object (step 514).

Therefore, the logging framework has the ability to dynamically load different implementation wrappers when the user modifies the configuration file. As described above, the watchdog thread intermittently checks the configuration file to determine whether it has been modified. If the configuration file has been modified, then the log manager object sends a message to the logger object, instructing the logger object to obtain the updated configuration file information from the log manager object. Accordingly, the logger object will replace the current implementation wrapper with the new implementation wrapper, as designated in the configuration file.

For example, when the logger object is created it may be implemented with the log4j wrapper in order to log information locally. Then, the user may want to log information remotely at the server computer system, and therefore modifies the configuration file to identify, for logger objects of a given name, that the implementation wrapper is the UNO wrapper instead of the log4j wrapper. Accordingly, the next time the watchdog thread reads the configuration file and identifies that the configuration file has changed, the logger object will obtain the configuration file information from the log manager object and implement the UNO wrapper in the logger object. Until the configuration file is modified again, the logger object will log information remotely to the log server. The logger object will replace its current implementation wrapper by executing the sequence of steps in FIG. 5, beginning at step 512, as indicated by entry point "A".

After the logger class instantiates the logging service implementation in step 514, the logger class obtains from the log manager object the logging threshold, and stores the logging threshold in the logger object (step 516). This allows the logger object to quickly lookup the logging threshold, instead of having to obtain it from the log manager object. Then, the logger class adds a listener to the logger object, wherein the logger object listens to the log manager object to be informed when the configuration file has been modified (step 518). Listeners are known to one of skill in the art and will not be described in further detail herein.

The logger class then stores the newly created logger object in log object list 236 so that if the user program calls a logger object, and a logger object with the given name already exists, it will not be recreated (step 520). The logger object is then returned to the user program (step 522).

Thus, the first time a logger object is obtained in step 402, e.g., the first time instruction 232 is executed, the sequence of steps in FIGS. 5, 6 and 7 will be executed to create the logger object and the log manager object, and to start the watchdog thread. Thereafter, the steps of FIGS. 6 and 7 are not executed because the log manager has already been created and the watchdog thread has already begun executing.

Referring back to FIG. 4, after the user program has obtained the logger object in step 402, the user program calls the logger object to log information (step 404). To log information relating to the user program using the logger object, the user adds an instruction 234 to the user program's code at each location where the user wants to call the logger object. Therefore, instruction 234 corresponds to step 404. For example, if there is a line of code in the user program that updates the value of a variable, the user can insert instruction 234 in the next line of code to call the logger object in order to log the value of the variable. Then, the user can view the log to determine whether the variable was updated properly. As described above, instruction 234 includes a log level associated with the call.

Figure 8:
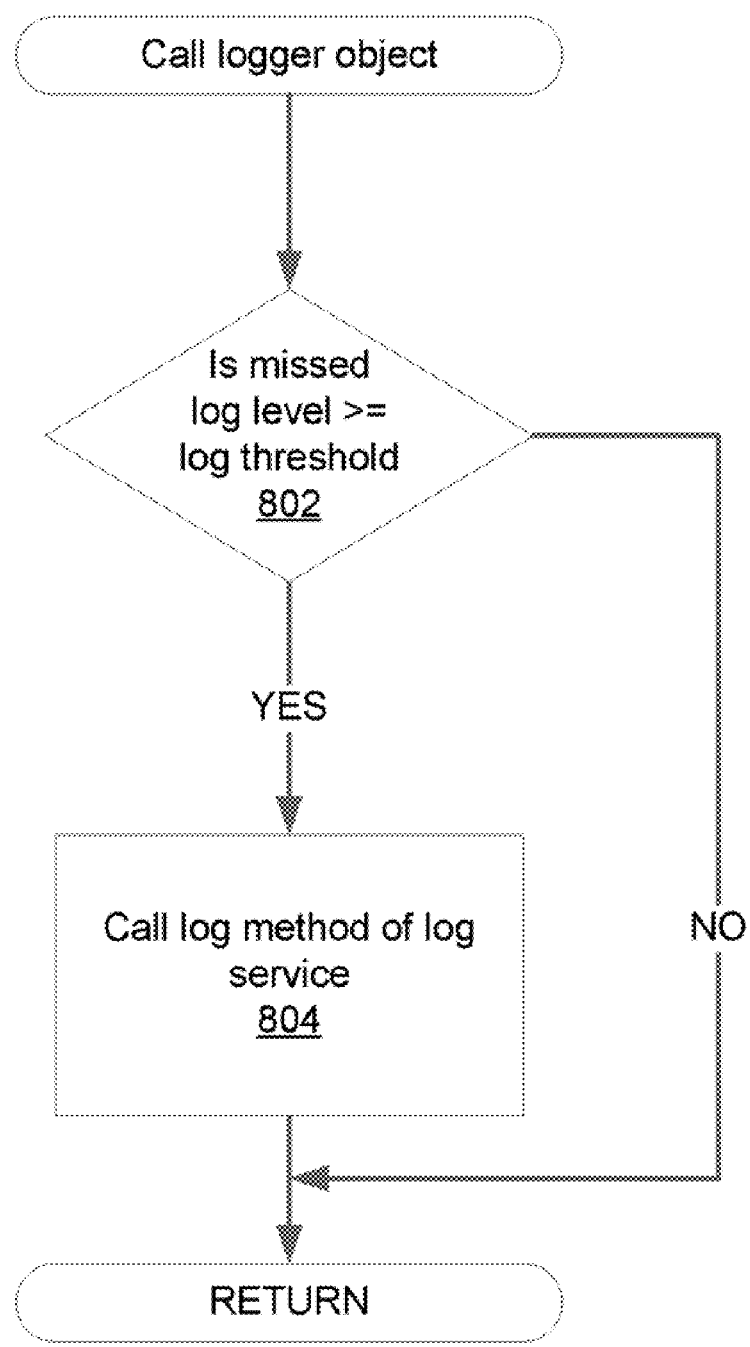
FIG. 8 depicts a flow diagram illustrating the steps performed by the logger object for logging data.

Referring to FIG. 8, FIG. 8 depicts a flow diagram illustrating the steps performed by the logger object for logging data. When the logger object is called in step 404, first the logger object determines whether the log priority level passed with the call is greater than or equal to the log threshold associated with the logger object (step 802). As described above, the log threshold is configured in the configuration file. In an example, instruction 234 calls the logger object and identifies a log level of SEVERE. The logger object then determines whether the log level of SEVERE is greater than or equal to a log threshold, such as INFO. If the logger object determines that the log level of the call is greater than or equal to the log threshold in step 802, and it is in the illustrative example, then the logger object uses the logging service implementation of the logger object to effect the logging. In other words, via the logging service implementation, the logger object sends the logging information to the appropriate output device.

If the logger object determines that the log level of the call is less than the log threshold in step 802, or after the log information is written in step 804, then execution returns to the next line of code in the user program.

Therefore, as described above, methods, systems, and articles of manufacture consistent with the present invention provide for automatically switching logging services while information is being logged from a running user program, without interrupting execution of the user program.

While the logging framework is described above as being implemented in the client computer system, a copy of the logging framework can also be implemented in the server computer system. For example, if the data processing system comprises a heterogeneous distributed data processing environment, there may be a log server program at the server, but no local logging programs at the server's clients. For this scenario, a local copy of the logging framework on the client computer system receives calls for the logging object from the user program and communicates the calls to a remote copy of the logging framework on the server computer system. The remote copy of the logging framework on the server performs the functionality described above with respect to the logging framework on the client computer system. Also, when a user, such as a system administrator, updates a copy of the configuration file 314 that resides on the server secondary storage, a log manager object of the remote copy of the logging framework on the server computer system, notifies all logger objects on the server's clients that the logger objects should be updated. Accordingly, methods, systems, and articles of manufacture consistent with the present invention provide for a central logging service on the server computer system, and provide for automatically switching logging services while information is being logged from a running user program on the client computer system, without interrupting execution of the user program.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method, comprising:
in a data processing system having a processor and a memory, the memory storing a program, the processor executing the program to perform the steps of:
reading a configuration file to determine a first destination for sending logging information;
sending the logging information to the first destination;
generating additional logging information;
determining whether the configuration file has been updated to indicate a new destination instead of the first destination;
obtaining a log object for sending the log information to the first destination;
obtaining a manager object for reading the configuration file;
when the configuration file has not been updated to indicate the new destination,
sending the additional logging information to the first destination;
when the configuration file has been updated to indicate the new destination,
prior to sending the additional logging information to the new destination,
notifying the manager object that the configuration file has been updated;
the manager object reading the configuration file to determine the new destination for sending the logging information;
notifying the log object to obtain an identity of the new destination from the manager object;

obtaining at the log object the identity of the new destination from the manager object; and the log object replacing its current logging implementation wrapper that corresponds to the first destination with a new logging implementation wrapper that corresponds to the new destination; and sending the additional logging information to the new destination, wherein determining whether the configuration file has been updated includes a watchdog timer repeatedly monitoring the configuration file, at a predetermined time interval, to check a date and time of the configuration file and to determine whether the configuration file has changed for an update of the configuration file at a predetermined time interval.

2. The method of claim 1, wherein the first destination is a local computer and the new destination is a remote computer.

3. The method of claim 1, wherein the first destination is a remote computer and the new destination is a local computer.

4. The method of claim 1, wherein the configuration file is located on a local computer.

5. The method of claim 1, wherein the configuration file is located on a remote computer.

6. The method of claim 1, wherein the manager object is obtained by the log object.

7. A computer-readable medium containing instructions that cause a program in a data processing system to perform a method comprising the steps of:

reading a configuration file to determine a first destination for sending logging information;

sending the logging information to the first destination;

generating additional logging information;

determining whether the configuration file has been updated to indicate a new destination instead of the first destination;

obtaining a log object for sending the log information to the first destination;

obtaining a manager object for reading the configuration file;

when the configuration file has not been updated to indicate the new destination, sending the additional logging information to the first destination;

when the configuration file has been updated to indicate the new destination, prior to sending the additional logging information to the new destination, notifying the manager object that the configuration file has been updated;

the manager object reading the configuration file to determine the new destination for sending the logging information;

notifying the log object to obtain an identity of the new destination from the manager object;

obtaining at the log object the identity of the new destination from the manager object; and the log object replacing its current logging implementation wrapper that corresponds to the first destination with a new logging implementation wrapper that corresponds to the new destination; and sending the additional logging information to the new destination, wherein determining whether the configuration file has been updated includes a watchdog timer repeatedly monitoring the configuration file, at a predetermined time interval, to check the date and time of the configuration file and to determine whether the configuration file has changed.

8. The computer-readable medium of claim 7, wherein the first destination is a local computer and the new destination is a remote computer.

9. The computer-readable medium of claim 7, wherein the first destination is a remote computer and the new destination is a local computer.

10. The computer-readable medium of claim 7, wherein the configuration file is located on a local computer.

11. The computer-readable medium of claim 7, wherein the configuration file is located on a remote computer.

12. The computer-readable medium of claim 7, wherein the manager object is obtained by the log object.

13. A computer-readable medium containing instructions that cause a program in a data processing system to perform a method comprising the steps of:

obtaining a manager object for reading a logging method identifier from a configuration file, the logging method identifier identifying a first logging method for logging information to a selected destination, the selected destination being a destination selected from a group of destinations consisting of a local destination and a remote destination, the first logging method selected from a group of logging methods each associated with one of the group of destinations;

the manager object reading the configuration file to determine the first logging method identifier;

obtaining a log object including the first logging method responsive to the manager object determining the first logging method identifier;

the log object sending the logging information to the selected destination using the first logging method;

generating additional logging information;

determining whether the configuration file has been updated to indicate a second logging method identifier identifying a second logging method, the second logging method selected from the group of logging methods and being different from the first logging method;

when the configuration file has not been updated to indicate the second logging method identifier, the log object sending the additional logging information to the selected destination using the first logging method; and when the configuration file has been updated to indicate the second logging method identifier, prior to sending the additional logging information, notifying the manager object that the configuration file has been updated;

the manager object reading the configuration file to determine the second logging method identifier;

the manager object notifying the log object to obtain the second logging method identifier from the manager object;

the log object obtaining the second logging method identifier from the manager object;

replacing the first logging method in the log object with the second logging method;

the log object sending the additional logging information to a new destination associated with the second logging method using the second logging method; and the log object replacing its current logging implementation wrapper that corresponds to the selected destination with a new logging implementation wrapper that corresponds to the new destination, wherein determining whether the configuration file has been updated includes a watchdog timer repeatedly monitoring the configuration file, at a predetermined time interval, to check the date and time of the configuration file and to determine whether the configuration file has changed.

14. A data processing system comprising:

a secondary storage device having a configuration file;

a memory comprising a program that, when executed by a processing unit, causes the processing unit to read a configuration file to determine a first destination for sending logging information, send the logging information to the first destination, generate additional logging information, determine whether the configuration file has been updated to indicate a new destination instead of the first destination, send the additional logging information to the first destination when the configuration file has not been updated to indicate the new destination, send the additional logging information to the new destination when the configuration file has been updated to indicate the new destination, obtain a log object for sending the log information to the destination, obtain a manager object for reading the configuration file, and when the configuration file has been updated to indicate the new destination, prior to sending the additional logging information:

notify the manager object that the configuration file has been updated, cause the manager object to read the configuration file to determine the new destination for sending the logging information, notify the log object to obtain an identity of the new destination from the manager object, obtain at the log object the identity of the new destination from the manager object; and cause the log object to replace its current logging implementation wrapper that corresponds to the first destination with a new logging implementation wrapper that corresponds to the new destination, wherein the determination of whether the configuration file has been updated includes a watchdog timer repeatedly monitoring the configuration file, at a predetermined time interval, to check the date and time of the configuration file and to determine whether the configuration file has changed; and the processing unit that runs the program.

* * * * *